June 20, 1967 A. F. WEBBER 3,327,288

SELF-EDITING DATA TRANSMISSION SYSTEM

Filed Aug. 26, 1963 3 Sheets-Sheet 1

INVENTOR.
ARTHUR F. WEBBER

BY Ervin F. Johnston
George J. Rubens
ATTORNEYS

June 20, 1967 A. F. WEBBER 3,327,288

SELF-EDITING DATA TRANSMISSION SYSTEM

Filed Aug. 26, 1963 3 Sheets-Sheet 2

INVENTOR.
ARTHUR F. WEBBER
BY Ervin A. Johnston
George J. Rubens
ATTORNEYS

SELF-EDITING DATA TRANSMISSION SYSTEM

Filed Aug. 26, 1963 3 Sheets-Sheet 3

INVENTOR.
ARTHUR F. WEBBER

BY Ervin F. Johnston
George J. Rubens
ATTORNEYS

United States Patent Office 3,327,288
Patented June 20, 1967

3,327,288

SELF-EDITING DATA TRANSMISSION SYSTEM

Arthur F. Webber, 1335 W. Spruce St., Oxnard, Calif. 93030

Filed Aug. 26, 1963, Ser. No. 304,746
5 Claims. (Cl. 340—146.1)

The invention described herein may be manufactured and used by or for the Government of the United States of America for governmental purposes without the payment of any royalties thereon or therefor.

The present invention relates to a self editing data transmission system and more particularly to a system which is suitable for transmitting data over telephone lines and through error checking ensures that the data received is identical to that which has been transmitted.

In the transmission of data over telephone lines and the like the problem has been to receive the data correctly when drop-outs or any other type of interference has been imposed upon the line. Various systems have been devised in the prior art for coping with erroneously received data. One such system has been to record all data received including data which is in error with a detection means for detecting that an error has been made and noting this at the receiver. The received data is then edited after transmission either by machine or by man to extract the correctly received data from that which is in error. Another technique has been to employ means at the receiver for detecting the error in transmission and send a pulse or coded message to the transmitter to cause it to back up its tape or other data generating device and repeating the last transmission until the data is received correctly. It is obvious that to edit the received data at the receiver or back up the data generating device at the transmitter involves a considerable amount of time and would render these devices inadequate where rapid data transmission is required. The present invention is an extremely rapid data transmission system which requires no editing of the data received. The rapid transmission is accomplished by providing a memory at both the transmitter and the receiver, the memory at the transmitter storing the data which was just transmitted out and the memory at the receiver storing the data which has just been received in and an error checking means at the receiver which will signal the transmitter to keep sending the data it has stored in its memory until the data is received correctly by the receiver. More specifically the transmitter transmits the data coded with parity bits in a code which is understood by the receiver. The receiver, upon decoding, will not accept the next group of information into memory until the last transmission is received correctly. If the receiver upon decoding the last transmission finds that there was an error therein it will signal the transmitter to retransmit the last information that is in the transmitter memory over and over again until the receiver receives this information correctly. Accordingly while there is a drop-out or interference on the telephone line the transmitter after receipt of a retransmit signal from the receiver, will continually send out the last transmission until the receiver has it recorded correctly. The result is that the recording of the data at the receiver will be exactly the same as that which was transmitted and will require no editing.

In a more narrow scope of the invention a pair of memories is utilized at both the transmitter and receiver with means at the transmitter for storing data within one of the memories while data from the other memory is being transmitted out and means at the receiver for storing received data within one memory while data within the other memory is being recorded. This arrangement provides an exceptionally high transmission rate of data by alternating between the memories within the transmitter and the receiver. The invention utilizes a novel arrangement of circuitry which is compatible with an error checking means for utilizing a pair of memories both in the transmitter and the receiver. This arrangement of circuitry offers a speed advantage heretofore believed impossible in the prior art for the transmission of data over telephone lines and the like.

Further the invention provides an arrangement of circuitry which will enable a change in the roles of the transmitter and the receiver, that is the transmitter can be made the receiver and the receiver can be made the transmitter. This is accomplished by arranging common circuitry within a subsystem and connecting the subsystem to a switch which will switch the subsystem into various modes of operation. In addition to a transmit mode and a receive mode of operation the invention also provides a copy mode of operation for the reproduction of data.

A further advantage of the present invention is that it ensures that the signaling by the receiver to the transmitter informing the transmitter whether the last transmission was received correctly or not will be transmitted by the receiver until the transmitter receives this signal error free. This is accomplished by generating talk-back signals in the receiver which are decoded with circuitry within the transmitter for detecting whether the talk-back signals are correct or not so as to tell the transmitter whether to send new data or retransmit old data and circuitry within the receiver for continually sending the talk-back signal until it is received correctly by the transmitter.

The invention enables the transmission of critical data over an ordinary telephone line where drop-outs will frequently occur. The invention has been found particularly useful in transmitting tracking and alert data to and from Navy satellite tracking stations over a telephone line. The invention has been named "TRADAT," which term will be used throughout this specification.

The invention is a binary system and accordingly is primarly made up of flipflop multivibrators. The invention is described in the specification by the use of logic block diagrams along with a detailed explanation of the function of each block so that one skilled in the art can employ flipflop multivibrators and gate circuits for designing the system that is required. The flipflop multivibrators will vary with the different functions to be fulfilled only in that various combinations of inputs will be required to turn them on and off. All of the block diagrams within the TRADAT will utilize a combination of these flipflop multivibrators and gates except a system clock, a switch, and the memory units. Reference is made to the following brochures put out by the Decisional Control Associates Inc. in Newport Beach, California for explanation of circuitry which has been found suitable in construction of the invention: "VersaLOGIC Universal Flip Flop," "VersaLOGIC System Flip Flop," "VersaLOGIC Expandable NAND Gate," "System NAND gate" and "Power Amplifier."

An object of the present invention is to provide a rapidly operating self editing transmission system.

Another object is to provide a transmission system which is self editing without the necessity of backing up a data generating means at a transmitter when a last transmission thereof has been received incorrectly.

A further object of the invention is to provide a device for transfer of data, free from errors, at an extremely rapid rate from one station to another.

Still another object is to provide a system for rapidly transferring data from one station to another over the ordinary telephone lines.

Yet another object of the present invention is to provide a device which is compatible with ordinary transmission lines and another device identical thereto for the transfer of data at an extremely rapid rate without any errors therein.

A still further object is to provide a device for the transfer of data from one station to another at an extremely rapid rate over a transmission line wherein both devices are capable of being operated in either a transmit mode or a receive mode.

Yet another object of the present invention is to provide transmitting and receiving equipment for transferring data at an extremely rapid rate from one station to another without any errors therein wherein both equipments can be operated in either a transmit mode or a receive mode.

A still further object is to provide a system for rapidly transmitting data from one station to another with means for ensuring that talk-back signals from the receiving station to the transmitting station are received correctly by the transmitting station.

Other objects and many of the intended advantages of this invention will be readily appreciated as the same becomes better understood by reference to the following detail description when considered in connection with the accompanied drawings wherein like reference numerals designate like parts throughout the figures thereof and wherein.

Figure 1:
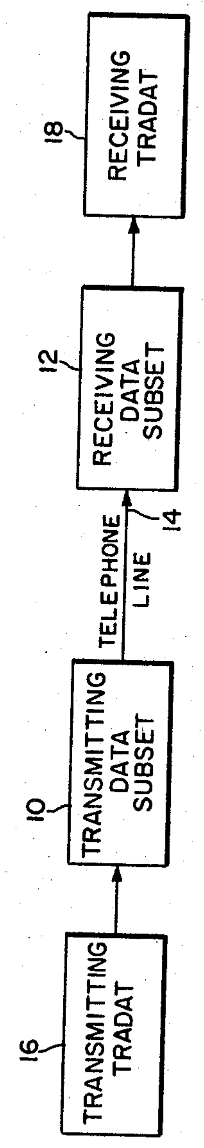
FIG. 1 shows a diagrammatic arrangement of the entire transmission system.

Referring now to the drawings, wherein like reference numerals designate like or corresponding parts throughout the several views there is shown in FIG. 1 a pair of identical data subsets 10 and 12, the subset 10 transmitting data and the subset 12 receiving data. The data subsets are telephone leased equipment and are manufactured by the American Telephone and Telegraph Company. They provide the buffer system between any customer logic system and a telephone line 14. When it is desired to transmit data over the telephone line 14 the data subset 10 receives digital information which is D.C. signal levels from a transmitting TRADAT 16 for a one and a zero and converts the D.C. levels to audio tones which are transmitted over the line 14. The data subset 12 receives these audio tones, demodulates them and converts them to D.C. levels and presents them to a receiving TRADAT 18. The data subset 10 merely provides a modulated carrier on the line and the data subset 12 demodulates this carrer back into D.C. levels. The data subsets 10 and 12 are identical and the TRADATS 16 and 18 are identical so that each piece of equipment is capable of operating either in a transmit or a receive mode. The description that follows of the circuitry shown in FIGS. 5 and 6 will apply equally to both TRADATS 16 and 18, however, in the transmit mode the transmitting TRADAT 16 and the transmitting data subset 10 will be referred to while in the receive mode the receiving TRADAT 18 and the receiving data subset 12 will be referred to.

Figure 5:
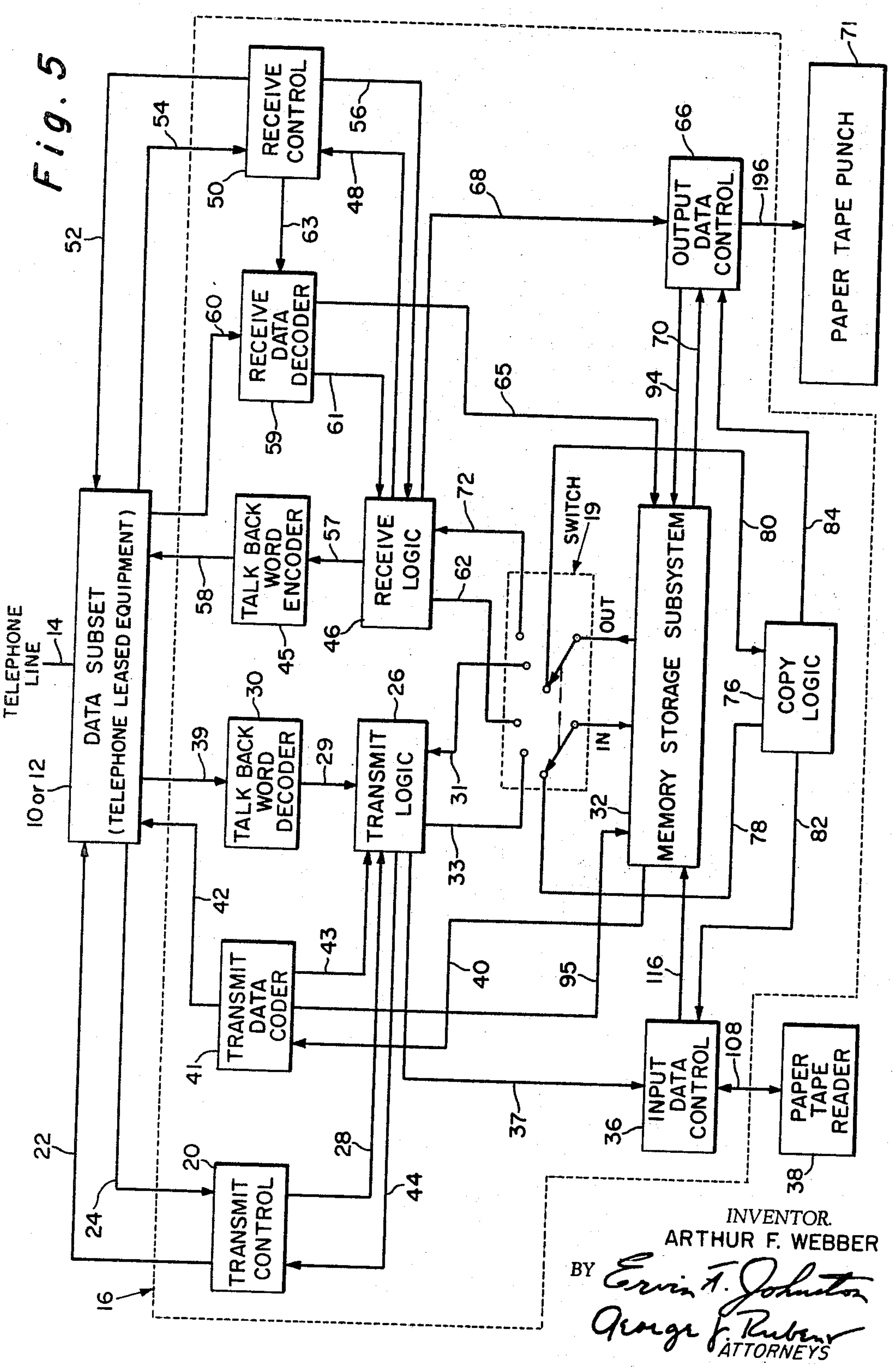
FIG. 5 is a logic block diagram and flow representation of one of the TRADAT's.

As shown in FIG. 5, a transmit control circuit 20 has the function of performing and obeying input and output requirements to the data subset 10 as specified in the manufactures specifications. The transmit control 20 sends a "get ready" signal via a line 22 to the data subset 10 requesting the latter to send data. When the data subset 10 receives this signal it performs a function on the line 14 which establishes the direction of the transmission, this being merely a function of existing telephone equipment. As soon as the data subset 10 has resolved that the lines are ready for transmitting data it sends back a signal via a line 24 to the transmit control 20 which indicates the lines are ready to send data. The transmit control 20, in turn, notifies the transmit logic current 26 via a line 28 that the data subset 10 is ready to transmit.

The transmit logic 26 is like a "clearing house" for the transmit operation and will perform several functions in order to make a decision whether to initiate a transmission cycle. The transmit logic 26 performs the following functions in order to make the decision: (1) it senses via a line 29 the result of a talk-back word from a talk-back word decoder 30 (to be described more fully hereinafter), which word tells the transmit logic unit 26 whether the receiving TRADAT 18 received the previous intelligence correct or not, (2) it senses, via a line 31 what the memory storage subsystem 32, where data is stored, has done last, (3) it tells the memory storage subsystem via a line 33 what to do next and whether the data stored in a memory A34 or a memory B35 (both shown in FIG. 6) within the memory storage subsystem 32 should be transmitted next and (4) it tells an input data control circuit 36 via a line 37 when to begin reading data from an external data source such as a paper tape reader 38.

Figures 3, 4:
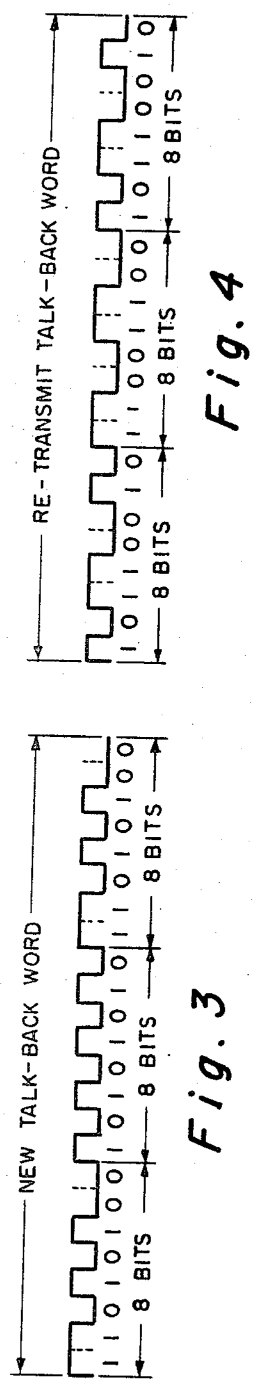
FIG. 3 is a diagrammatic representation of a bit configuration for a new talk-back word signal transmitted by the receiving station.
FIG. 4 is a diagrammatic representation of a bit configuration of a retransmit talk-back word transmitted by the receiving station.

The talk-back word is transmitted by the receiving TRADAT 18, the latter classifying the quality of the last transmission from the transmitting TRADAT 16 (to be described more fully hereinafter). FIGS. 3 and 4 show two possible bit configurations, for the talk-back word, one configuration being a new talk-back word and the other configuration being a retransmit talk-back word. These talk-back words are received by the talk-back word decoder 30 via a line 39 from the data subset 10. If the receiving TRADAT receives a data word correctly it will generate the new talk-back word but if the data word was received incorrectly it will generate the retransmit talk-back word (to be described more fully hereinafter). As shown in FIGS. 3 and 4 the new talk-back word and the retransmit talk-back word are each made up of 24 bits. The decoder 30 checks bit for bit each of the 24 bits of a talk-back word and compares this configuration with the two known talk-back word configurations.

Assuming a retransmit talk-back word comes into the decoder 30, it is compared bit for bit with a known retransmit talk-back word configuration. If there is a comparison the decoder 30 will send a signal to the transmit logic 26 via the line 29 telling it to transmit out the last data from the transmitting TRADAT 16 once again. On the other hand, assume that the talk-back word decoder 30 has sent to the transmit logic 26 a signal that says to transmit new data. The transmit logic 26 will tell the memory storage subsystem 32 via the line 33 to send out data from one of its two memories A or B, this data being old data transmitted before if the decoder 30 receives a retransmit talk-back word or new data if the decoder 30 receives a new talk-back word. The memory storage subsystem will then begin to output either the old data or the new data via a line 40 to a transmit data coder 41.

Figure 2:
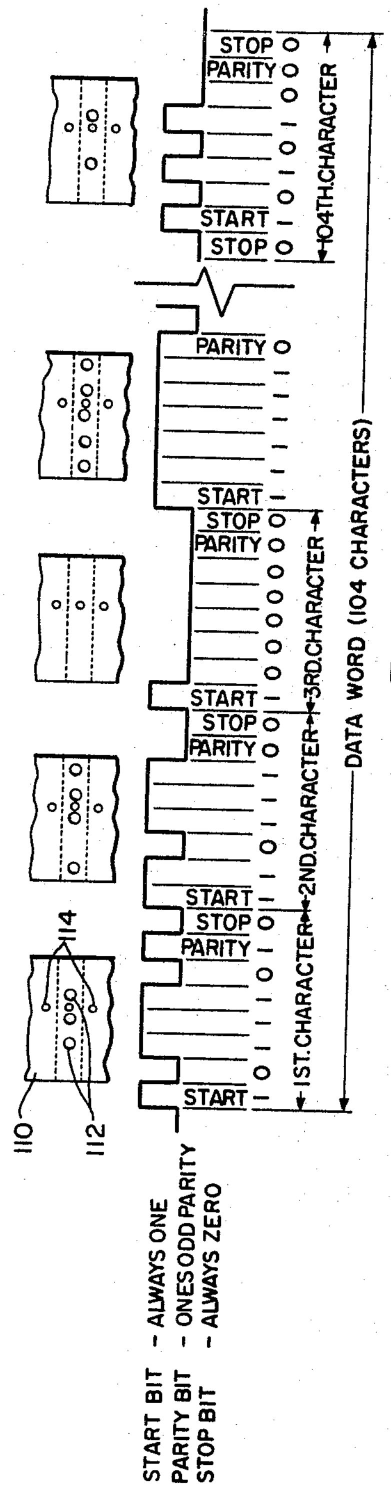
FIG. 2 shows a diagrammatic representation of the bit configurations for various characters making up a data word along with corresponding tape inputs.

Upon receiving data from the memory storage subsystem 32 the transmit data coder 41 codes the data by adding stop, start and parity bits and feeds this data via a line 42 to the subset 10 for transmission. As shown in FIG. 2 the intelligence provided by a tape has 5 bits of information which along with the stop, start and parity bit added by the transmit data coder 41 make up 8 bits of information for each character. The start bit is always one and the stop bit is always zero. The parity bit will be such (either one or zero) that there is always an odd number of ones within each character.

Further, the transmit data coder 41 acts as a speed buffering device. The data is sent to the data subset 10 at approximately a 1.2 kc. rate which is the fastest that the data subset can send data on a telephone line. However, the transmit data coder 41 receives data from either the memory A or B in the subsystem 32 at the rate of 1 megacycle. The transmit data coder 41 reads eight bits, or one character, from the memory storage subsystem 32 at a rapid rate and then tells the memory storage subsystem it has data. The memory storage subsystem holds all remaining data until the transmit data coder 41 has transmitted all of the eight bits at a 1.2 kc. to the data subset 10. When the last bit is transmitted, the transmit data coder 41 sends a signal via a line 43 to the storage subsystem 32, to get a new character of 8 bits in. The memory storage subsystem 32 will then take the next eight bit character from memory A or B and sends it, at a one megacycle rate, to the transmit data coder 41 again. This will continue until one hundred and four characters have been sent out at which time the transmit logic 26 receives a signal from the memory storage system via the line 31 saying that the memory just used has been emptied.

The transmit logic 26 will then send a signal via a line 44 to the transmit control 20 stating the transmission is finished. The transmit control 20 will then take the "get ready" signal off of the subset 10. The transmit logic 26 will also send a signal via the line 33 to the memory storage subsystem 32 to stop data from being sent from the memory storage subsystem since the latter detects if the memory A or B is empty. The talk-back word decoder 30 is now awaiting a talk-back word coming in via the line 39, to be described next.

*Receive mode*

Next are the blocks concerned with the receive mode of operation of the TRADAT. Upon initiation of transmission the first function performed by the TRADAT in the receive mode is for a talk-back word encoder 45 to send out a retransmit talk-back word as the first data transmitted over the line between the subsets 10 and 12. Before starting a transmission the transmitting TRADAT 16 is initialized. The transmitting decoder 30 expects, as a first word of any transmission, a retransmit talk-back word from the receiving TRADAT 18 as a starting code. After the receiving TRADAT initiates operation, a receive logic circuit 46 will send a signal via a line 48 to a receive control circuit 50 telling the receive control 50 to prepare the data subset 12 to send out a talk-back word. The receive control unit 50 sends a "get ready" signal via a line 52 to the data subset 12 notifying the latter to prepare the telephone lines. The data subset 12 goes through the operation of establishing the telephone line conditions identical to that which has already been described for the transmitting TRADAT 16. When the data subset 12 sends back a signal via a line 54 to the receive control 50 that it is ready to send data the receive control 50 notifies the receive logic 46 via a line 56 that a talk-back word can now be transmitted.

The receive logic 46 upon initiation of transmission establishes that a retransmit talk-back word is to be transmitted out as the very first transmission between the TRADATS 16 and 18. The receive logic 46 then tells the talk-back word encoder 45 via a line 57 whether to transmit a new talk-back word or a retransmit talk-back word. The talk-back word encoder 45 sends the proper talk-back word to the data subset 12 via a line 58 after which the word is transmitted to the transmitting TRADAT 16. As stated before, initially the first talk-back word going out will be a retransmit talk-back word. After the retransmit talk-back word has been sent out, the receive logic 46 starts a counter running therein which has a count time of one second. If the transmitting TRADAT 16 responds to this talk-back word within a second the counter will be reset back to zero and stopped and data will be received into the receiving TRADAT 18 normally. In the event that the talk-back word has been sent out and this counter reaches a count which signifies one second has elapsed since the talk-back word has been transmitted, the receive logic 46 will again reinitiate the same talk-back word and transmit it to the transmitting TRADAT 16. This operation will continue until the transmitter responds within a second to a talk-back word.

Assuming that a talk-back word has been sent out and the transmitting TRADAT 16 is responding. Within 3 or 4 hundred milliseconds, the data subset 12 will indicate to the receive control 50 via the line 54 that data will be coming in from the transmitting TRADAT 16, this indication being in the form of a "carrier on" signal. If the receive control 50 receives a "carrier on" signal, it will in turn, send a signal to the receive logic 46 via the line 56 indicating the lines are ready.

When the transmitting TRADAT 16 is sending data, the receive logic 46 is not sending a "get ready" signal to the data subset 12. The receive logic 46 will then make the decision that data is to be received from the transmitting TRADAT 16. After the receive logic 46 makes this decision, a receive data decoder 59 is prepared for reception of data by a signal from the receive control 50 via a line 63. The receive data decoder 59 receives in eight bits of information at a time, serially, from the telephone line 14 via the data subset 12 and a line 60 at 1.2 kc. rate, the same rate at which the data is transmitted by the transmitting TRADAT 16. When the receive data decoder 59 counts that it has received in eight bits of information it then counts the number of ones that is in the data message. It then makes the decision as to what the parity bit should be. If the received parity bit is what it is expected to be, the receive data decoder 59 indicates that the data was received correctly. Thereupon the receive data decoder 59 sends a signal to the receive logic 46 via a line 61 which says the receive data decoder 59 has one good character. The receive logic will then tell the memory storage subsystem 32 that there are eight bits that are to be put into one of the memories A or B of the memory storage subsystem by sending a signal via a line 62 to an input register loaded unit 64 of the memory storage subsystem. The memory storage subsystem will then respond to this signal and at the proper time data will be shifted from this receive data decoder 59 via a line 65 into the memory storage subsystem at a 1 megacycle rate. The receive data decoder 59 performs a speed buffering function by receiving the data slow (1.2 kc.) and putting it into memory fast (1 mc.).

Upon the transmitting TRADAT 16 completing sending out 104 characters, it terminates transmission. The receive control unit 50 detects that the transmitting TRADAT 16 terminated transmission. When the receive control unit 50 detects this completion of sending data, the receive logic 46 checks all of the receive data decoder 59 flipflops via the line 61 to see if any one of the character parity checks has failed. If no checks have failed the receive logic 46 will send signals to the memory storage subsystem 32 via the line 62 which will tell the memory storage subsystem that the data that has just been received into memory A or memory B was received correctly. Also the receive logic unit 46 sends a signal to an output data control circuit 66 via a line 68 indicating that the data just received was correct. Thereupon the output data control 66 will start extracting the data from the memory storage subsystem 32 via a line 70 and record it on a paper tape punch 71 or other recording device.

If the receive logic 46 indicates that an error was detected by the receive data decoder 59, the receive logic 46 will send a signal to the talk-back word encoder 45 via the line 57 that will direct the talk-back word encoder to transmit out a retransmit talk-back word. In the event that this happens a retransmit talk-back word will be transmitted to the transmitting TRADAT 16. Further, the receive logic 46 has an indication via a line 72 whether memory A or B was being used and will send a signal to the memory storage subsystem 32 via the line 62 and tell it to change the status of the memory in use to empty again. When the retransmitted data comes in, it overrides the erronous data in memory. If a 104 characters are received correctly and the receive logic 46 detects this, it notifies the talk-back word encoder 45 to send out a new talk-back word configuration to the transmitting unit TRADAT 16. This process is continued until all the data is received correctly by the receiving TRADAT 18.

*Copy mode*

The copy mode is merely a combination of the transmit and receive modes in that a copy logic circuit 76 concerns itself only with controlling the memory storage subsystem 32 via a line 78. The copy logic 76 senses the status of the memory storage subsystem via a line 80, controls the input data control 36 via a line 82 and controls the output data control 66 via a line 84. In the copy mode of operation, data is not sent or received over the telephone line 14. Upon initiating the copy mode, the copy logic 76 notifies the input data control 36 to fill up memory A and B with data. When memory A is filled with data, the copy logic 76 notifies the output data control 66 that memory A is full and the output data control unit 66 begins to read out and record the contents of memory A on the recorder 71. When memory A has been read out and recorded, the copy logic 76 senses this status via the line 80 and directs the output data contorl unit to read out and record the contents of memory B and also directs the input data control 36 to input new data into memory A. When memory B is read out and recorded, the output data control 66 is directed to read out of memory A and the input data control 36 is directed to input new data into memory B. This process is continued until the operation is completed.

*Memory storage subsystem*

Figure 6:
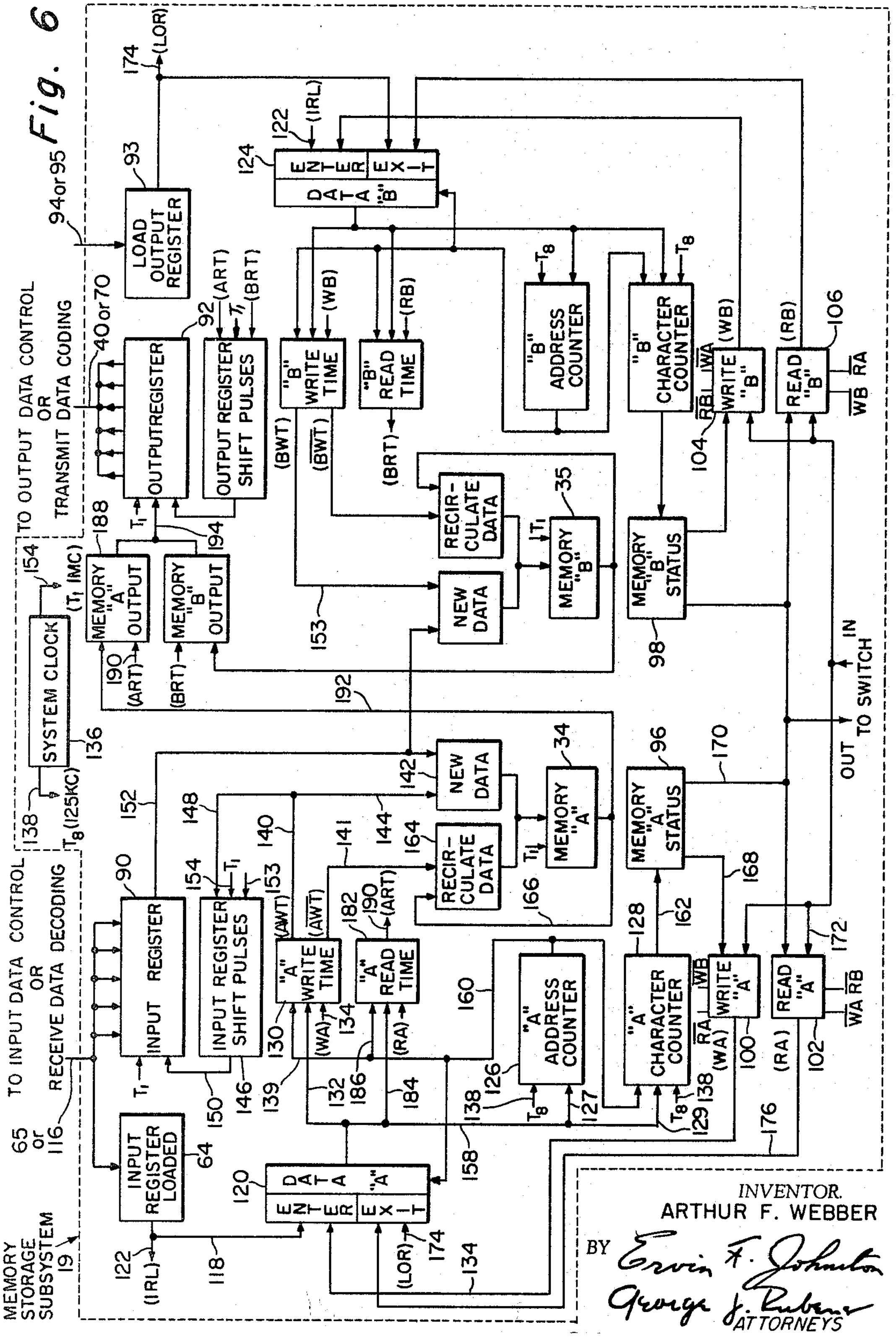
FIG. 6 is a logic block diagram and flow representation of the memory storage subsystem within one of the TRADAT's.

The heart of the TRADAT system is the memory storage subsystem 32 which provides the date storage in the transmit, receive and copy modes. The memory storage subsystem 32 receives data through an input register 90 from the receive data decoder 59 in the receive mode, or from the input data control 36 during the transmit and copy modes. An output register 92 outputs data to the transmit data coder 41 in the transmit mode and to the output data control 66 in the receive and copy modes. The input register loaded circuit 64 also receives the output of the receive data decoder 59 via the line 65 in the receive mode and the output of the input data control 36 in the transmit mode and the copy mode. A load output register circuit 93 receives the output of the output data control 66 via a line 94 in the receive and copy mode and receives the output of the transmit data coder 41 via a line 95 in the transmit mode. Generally the inputing of data to the memory subsystem 32, is shown in the upper left hand corner of FIG. 6 and the outputing of data from the memory subsystem 32 is shown in the upper right hand corner of FIG. 6. At the center bottom of FIG. 6 are the inputs and outputs for the transmit logic 26, receive logic 46 and copy logic 76. The memory storage subsystem 32 operates identically in all three modes of operation. Once the data is received into the input register 90 and the input register loaded 64 receives a signal from the input subsystem the data is handled within the subset 32 the same way in all three modes of operation. It is externally controlled, however, as to the time it operates by the transmit, receive and copy logic circuits 26, 46 and 76.

The copy mode will be described first since the inputs to the subset 32 can be more simply defined. When commencing operation a memory A status circuit 96 and a memory B status circuit 98 will indicate that both memories A and B are empty. Associated with the memories A and B are a write A circuit 100 and a read A circuit 102 and a write B circuit 104 and a read B circuit 106. The rules for controlling these four circuits are established by the logic control units, the transmit logic 26, the receive logic 46 and the copy logic 76. In the copy mode the system is initialized and the memory A status 96 and the memory B status 98 indicates to the copy logic 76 via the line 80 that the memories A and B are empty. The copy logic 76 will then make a decision to arbitrarily turn on write A100 first. When write A is turned on a signal is sent by the copy logic 76 via the line 82 to the input data control 36. The input data control then directs the paper tape reader 38 via a line 108 to start inputing data.

The data will be taken into the subsystem 32 from the input data control 36 at the input register 90. This data comes from a paper tape 110 as shown in FIG. 2 which has a transverse line of blacks or large holes 112 representing a character. The blank represents a zero or false signal and the large hole represents a one or a true signal. Small holes 114 on the tape are perforations from a sprocket of a paper tape puncher (not shown) and come up once for each character. The input data control 36 reads in the characters in parallel and will transfer this data to the input register 90 via a line 116 to the five lines going into the input register 90. The holes 112 representing bits may or may not be in a character but the sprocket hole 114 is always present. When a sprocket hole is detected this causes a signal to be sent to the input register loaded 64, the signal indicates that the input register 90 is loaded. The paper tape reader 38 in this case is read at a rate of one character each 16 milliseconds. The input register loaded pulse is sent via a line 118 to enter the portion of an enter-exit data A circuit 120 and sent via a line 122 to an enter portion of an enter exit data B circuit 124. If write A100 is true (i.e. has an output), and the input register loaded 64 is true, this will allow enter exit data A120 to turn on and during this time write B104 will be false (i.e. has no output) so as to keep the enter exit data B124 in an off condition. This will cause the enter exit data A120 to notify an A address counter 126 via a line 127 and an A character counter 128 via a line 129 that data is to be entered into memory A34.

In order to enter the data into memory A34 at the proper time, it must be entered at the right address. This is accomplished by an A write time circuit 130 which will ensure that the data is taken out of the input register 90 and transferred to the memory A at a specific time. The data can be temporarily stored in the input register 90 until a next character arrives. When the inputs on lines 118 and 134 are true to the enter exit data A120 the latter further notifies the A write time 130 via a line 132 that data is in the input register 90. Another condition to turn the A write time 130 on is for the write A100 to be true (or on) this signal being sent via a line 134. The A address counter 126 counts from zero to one hundred and four. The count pulses from a system clock 136, are sent to the A address counter 126 via a line 138. The system clock 136 is free running. Data will always be entered into memory at the address of zero. Therefore the A address counter 126 is counting continually at a frequency that has an eight microsecond period, this period defining a character length within the memory. When the enter exit data A120 sends a true signal to the A write time 130, the A address counter 126 can be anywhere between the count of zero and 104, so the A write time 130 will not be turned on until the counter 126 detects the count of zero, this count being the correct address for entering data. When the A address counter 126 detects the count of zero it sends a true signal up to the A write time 130 via a line 139. Since the A address counter 126 holds a count for an eight microsecond interval, the zero address will only be true for eight microseconds. When there is a true on the write A100 output, a true on the enter exit data A output and the A address counter 126 is at zero so as to have a true output the result is that the A write time 130 will go true on a line 140 and go false on a line 141. When the A write time 130 goes true on the line 140 it puts a true input into a new data circuit 142 via a line 144 and the same input into an input register shift pulses circuit 146 via a line 148. The input register shift pulses 146 will then send eight one microsecond pulses to the input register 90 via a line 150 that will shift the data from the input register 90 serially via a line 152 into the new data 142. The same process will occur when a true signal is received on a line 153 from a B write time circuit in which case the data in the input register 90 will be shifted to a new data circuit which goes into the memory B35. The pulses that are shifted by the input register shift pulses 14 are obtained from the system clock 136 via a line 154, this line furnishing one microsecond pulses. The new data 142 will then transfer the data to the memory A34 for storage. After the data is entered into the memory A the enter exit data A120 goes false and awaits for the next character of data to come into the input register 90.

Initially when the memory A was empty the A character counter 128 was at a count of zero. Upon taking in data into memory A the enter exit data A120 sent a true signal to the A character counter 128 via the line 129, the A address counter 126 sent a true signal to the counter 128 via a line 160 and the system clock 136 sent a true signal to the counter 128 via the line 138 causing the counter 128 to take up a count of one. Now when the next data character is ready to go into the memory A it must not go in at the same address as that of the previous data character. Since the address of the first data character was zero the count of the A address counter 126 for the next data character must be one. Accordingly, when the previous character was put into the memory A the A address counter 126 was prohibited from counting one count by a true signal from the enter exit data A120 via the line 127. When the A address counter recycles and counts until it comes to zero again it is really one count in time past the previous zero. In order to ensure that the A address counter 126 is prohibited from counting only one character a false output from the A address counter over the line 160 (due to the true input over the line 127) is fed to the enter exit data A120 to switch the latter back to an off condition. This off condition changes the signal on the line 127 to false and allows the A address counter 120 to start counting again. When the A address counter comes to the second zero the second data character is allowed to enter the memory A if all the other circuits are true.

When the second data character is put into the memory A the A character counter 128 is indexed by one again so that it takes on the count of two. The A character counter 128 indicates the number of data characters that have been put into the memory A. After a character is put into the memory A there will not be a new character for 16 milliseconds. It only takes 832 microseconds for the data in the memory A to circulate and this data is kept in storage by a recirculate data circuit 164 which will recirculate the data within the memory A. When the A write time 130 is not receiving all true inputs the output on the line 141 is true and is sent to the recirculate data 164 to enable it to operate and recirculate the data within the memory A via a line 166.

When a count of 104 characters is detected by the A character counter 128 memory A is full and the A character counter signals the memory A status 96 via the line 162 to cause the memory A status to change its status to full. When the status of the memory A status 96 is full it signals the write A100 via a line 168 to turn off the write A since no more data can be stored into the memory A. The memory A status 96 then signals the copy logic 76 via a line 170 that the memory A is full whereupon the copy logic 76 signals the output data control 66 via the line 84 that the memory A is full and that data is to be taken out. The output data control 66 is then readied to output the data from the memory A to the paper tape punch 71. At the same time the copy logic 76 signals the input data control 36 via the line 82 that the memory A is empty which causes the input data control to start taking data in.

The status of memory A indicates full and data is to be read out. The function of the memory storage subsystem 32 during the recording of data out of the memory A is similar to the inputting of data into the memory. The difference is that the write A100 is false (because the memory A is full) and the read A102 is true, the latter being true because of a signalling by the copy logic 76 via a line 172. After the output data control 66 has been readied for outputting data it will signal the load output register 93 via the line 94. The load output register 94 is then turned on and sends a signal to the enter exit data A via a line 174. This signal along with a true signal from the read A102 via a line 176, a false indication from write A100 via the line 134 and a false indication from the input register loaded 64 via the line 118 all to the enter exit data A120 causes the latter to send a true pulse to the A read time circuit 182 via a line 184.

It is to be noted that data is not written and read from the memory A34 at the same time nor is the data read from both the memories A and B at the same time. The same rules apply to the write B104 and the read B106. To ensure that these rules are carried out each write and read circuit is responsive to the other write and read circuits that must be off before it will operate. This is accomplished in the following manner: (1) the output of the read A102 and the output of the write B104 are fed into the write A100 over leads $\overline{RA}$ and $\overline{WB}$ (the lines above these characters indicating a not read A output and a not write B output respectively) or otherwise stated on off condition of these circuits (2) the output of the write A100 and the output of the read B106 are fed into the read A102 over leads $\overline{WA}$ and $\overline{RB}$, (3) the output of the read B106 and the write A100 are fed into the write B104 over leads $\overline{RB}$ and $\overline{WA}$ and (4) the output of the write B104 and the read A102 are fed into the read B106 over leads $\overline{WB}$ and $\overline{RA}$. Accordingly, each circuit will turn on only when the other circuits having their outputs entering therein are in an off condition.

Since the memory A is filled it has in storage the 104th character, the first character being adjacent thereto. As stated before the address counter 126 is prohibited from counting a character (or precessed) upon each character going into the memory A. Upon completion of the write cycle of the zero address of the A address counter 126 the zero address will be set right over the first character that was put into the memory A, i.e., the A address counter has been precessed 104 times and now the zero address is right over the data that is to be taken out of the memory A. When this zero address comes up in the A address counter 126 the latter will supply a true signal to the A read time 182 via a line 186. At this time the A address counter 126 will again be precessed, moving the address of zero over to the second character in memory A. Further, when the 104th character is read out of the memory A, the A character counter 128 will be precessed by one. It is to be noted that this arrangement eliminates the requirement of 104 flipflops used in prior art address counters. The A read time 182 operates in the same manner as the A write time 130 in that it produces an eight microsecond true signal only during a zero address of the A address counter 126. The result is that all three inputs to the A read time 182 are causing the latter to send a true input to a memory A output circuit 188 via a line 190. The memory A output 188 has the data applied thereto from the memory A via a line 192 and the memory A output 188 will shift the data to the output register 92 via a line 194. An output register shift pulses circuit operates in a similar manner to the input register shift pulses circuit 146. The former will shift the data out of the output register 92 when the former receives a true signal from the A read time 182, a B read time circuit and when $T_1$ is true from the system clock 136.

Since the data has been sampled from the memory A the A address counter 126 has been precessed by one causing the output therefrom to the A write time 130 to go false and the latter to shut off. The output register 92 then outputs its data to the output data control 66 via the line 70 and the output data control 66 feeds the data to the paper tape punch 71 via a line 196. This process is continued until the count of 104 is detected by the A character counter 128 at which time the memory A status 96 is changed back to empty again.

The process for filling the memory B35 is the same as that described for filling the memory A and will occur while data from the memory A is being exited. The circuitry labeled B on the right side of FIG. 6 will operate the same as that described for the components labeled A except the time of operation is different.

The memory storage subsystem 32 functions in an identical manner in all three modes of operation, however, the devices inputing to the input register 90 or receiving the output from the output register 92 will be different in the three modes of operation. For instance in the transmit mode the output from the output register 92 is sent to the transmit data coder 41 via the line 40 rather than to the output data control 66. The transmit data coder 41 will control the subsystem 32 in the same manner as the output data control 66 controlled it in the copy mode except that it exits data at a different rate. In the receive mode the input register 90 will receive data from the receive data decoder 59 via the line 65 rather than from the input data control 36.

The circuitry for the logic block diagrams just described can be made on printed circuit boards. These circuit boards will have pins that interconnect the circuits and plug into a common power supply which will supply power to each one of the logic block diagrams just described.

*Operation*

In the operation of TRADATS the operator of the transmitting TRADAT 16 will call the operator of the receiving TRADAT 18 up on the line. The operator of the transmitting TRADAT will select the transmit mode of operation at the switch 19 and the operator at the receiving TRADAT 18 will select the receive mode of operation at a similar switch. It is to be noted that the transmitting TRADAT 16 can become the receiver and the receiving TRADAT 18 can become the transmitter by simply changing the mode of operation at the respective switches. Before selecting the modes the operators will initialize all circuits by pushing a reset button (not shown) which will set the memories A and B and the character counters A and B to zero. At the end of transmission should either memory A or B be only partially loaded (less than 104 characters) the operator of the transmitting TRADAT 16 will push an "end transmission" button (not shown) which will fill up the memory with 104 characters so that the memory can be emptied. That which has been added to fill up the tapes will be zero data and will merely come out as a leader on a tape at the receiving TRADAT 18.

The data to be transmitted can originate from punched paper tape, electric typewriters of any type, digital computers, magnetic tape reproducing equipment or any other electronic, electrical, mechanical, or electro-mechanical devices which produce a time base pulse train of electrical impulses or contact closures as an output signal. The receive data may be recorded on punched paper tape, magnetic tape or any electronic, electrical, mechanical, or electro-mechanical device which will produce an intelligible record for human or machine processing. The receive data may be stored in digital computer memories for immediate or delayed processing or electronic, electrical, mechanical, or electro-mechanical memory units for delayed recording.

It is now readily apparent that the present invention offers many advantages heretobefore thought impossible in the prior art. The invention ensures the transfer of data from one station to another at an extremely rapid rate without any errors whatsoever in the data finally recorded. By employing circuitry which is capable of utilizing a pair of memories either at the transmitting station or the receiving station or both the rate of transmission is greatly enhanced. The rate at which the data can be transferred by the teaching of the present invention is up to 1,000,000 bits per second. The circuitry at both the transmitter and the receiver is constructed such that it can operate in either a transmit or a receive mode so that their roles can be reversed. The invention has enabled the transfer of data free from errors at an extremely rapid rate over lines such as telephone lines which will invariably introduce drop-outs and interference into the system.

Obviously many modifications and variations of the present invention are possible in the light of the above teachings. It is therefore to be understood that within the scope of the appended claims, the invention may be practiced otherwise than specifically described.

I claim:

1. A system for transferring data without error from a transmitting station to a receiving station wherein the data is in the form of bits of information, said system comprising:
- each of said stations having a memory storage circuit;
- the transmitting station having means connected to a data source for feeding data to the memory storage circuit within said transmitting station;
- means responsive to the transmitting station's memory storage circuit for sampling the data therein and coding said data by adding bits of information thereto;
- said transmitting station having means for transmitting the coded data to the receiver through a single channel;
- said receiving station having means for receiving the coded data that is transmitted by said transmitting station through said single channel;
- said receiving station having means for decoding the received data so as to determine whether the data was correctly transmitted or not;
- means for feeding the decoded data to the receiving station's memory storage circuit;
- means responsive to the decoding means for indicating to the transmitting station through said single channel whether or not the data was received correctly;
- said transmitting station having means responsive to the indicating means for transmitting new data through said single channel if the previous data was received correctly and re-transmitting the previous data if the latter was received incorrectly; and
- means connected to said means for decoding for feeding the data stored in the receiving station's memory storage circuit to an output when the latter data has been received correctly.

2. A system for transferring data without error from a transmitting station to a receiving station wherein the data is in the form of bits of information, said system comprising:
- each of said stations having a pair of memory storage circuits;
- the transmitting station having means for feeding data from a data source alternatively to the memory storage circuits within said transmitting station;
- means responsive to the transmitting stations memory storage circuits for alternatively sampling the data therein and coding said data by adding bits of information thereto;

said transmitting station having means for transmitting the coded data to the receiver through a single channel;

said receiving station having means for receiving the coded data that is transmitted through said single channel;

said receiving station having means for decoding the received data so as to determine whether the data was correctly transmitted or not;

means for alternatively feeding the decoded data to the receiving station's memory storage circuits;

means responsive to the decoding means for indicating to the transmitter station through said single channel whether or not the data was received correctly;

means at the transmitter responsive to the indicating means for transmitting new data if the previous data was received correctly and re-transmitting the previous data if the latter was received incorrectly; and means responsive to said means for decoding for alternatively feeding the data from the receiving station's memory circuits to an output when the data has been received correctly.

3. A transceiver for enabling rapid transfer through a single channel of digital data characters which are combined to make up data words without error between said transceiver and another similar transceiver wherein said transceiver is capable of operating in either a transmit mode or a receive mode, said transceiver and said similar transceiver having means for error checking received data and initiating in a retransmission thereof if received incorrectly, said transceiver comprising:

a pair of memory storage circuits wherein each circuit is capable of storing a data word;

an input register connected to each memory storage circuit for receiving a data character transmitted by said similar transceiver through said single channel when said transceiver is in said receive mode or receiving a data character to be transmitted through said single channel to said similar transceiver when said transceiver is in said transmit mode;

an output register connected to each memory storage circuit for transferring data words stored in the latter to said similar transceiver when said transceiver is in the transmit mode or transferring the stored data words to a recording device when said transceiver is in the receive mode;

means connected to said error checking means and the input register for gating a new data word through the input register to a respective memory storage circuit when a previous data word stored therein has been transmitted therefrom or received therein correctly;

means connected to said error checking means and the output register for gating a data word stored on a respective memory storage circuit through the output register when the latter data word has been received therein correctly;

means interconnecting both gating means for writing a new data word into only one memory storage circuit at a time and reading a previous data word from only one memory storage circuit at a time and for only writing into or reading from either of the memory storage circuits at the same time; and timing means connected to the memory storage circuits and both of the gating means for shifting new data into the memory storage circuits or shifting stored data therefrom at a proper address.

4. A transceiver as claimed in claim 3 wherein said timing means includes:

an address counter which counts said data characters and gates data into a respective memory storage circuit at a zero address;

means connected to both of said means for gating for turning the address counter off for the count of one character each time data is entered into or exited from a respective memory storage circuit whereby the amount of circuitry within said address counter is minimized.

5. A transceiver as claimed in claim 4 wherein said timing means further includes:

means connected to said address counter and both of said means for gating for turning off the gating means immediately after the entry of data into or exit of data from a respective memory storage circuit.

References Cited

UNITED STATES PATENTS

| | | | |
|---|---|---|---|
| 2,706,215 | 4/1955 | Van Duuren | 340—146.1 X |
| 3,001,017 | 9/1961 | Dirks | 340—146.1 X |
| 3,154,638 | 10/1964 | Van Dalen | 340—146.1 X |

MALCOLM A. MORRISON, *Primary Examiner.*

M. J. SPIVAK, *Assistant Examiner.*